(12) United States Patent
Takano

(10) Patent No.: US 7,269,390 B2
(45) Date of Patent: Sep. 11, 2007

(54) RADIO COMMUNICATIONS SYSTEM, BASE STATION, MOBILE STATION, TRANSMISSION CONTROL METHOD, AND TRANSMISSION CONTROL PROGRAM

(75) Inventor: Hiroaki Takano, Saitama (JP)

(73) Assignee: Sony Corporation, Tokyo (JP)

( * ) Notice: Subject to any disclaimer, the term of this patent is extended or adjusted under 35 U.S.C. 154(b) by 524 days.

(21) Appl. No.: 10/252,695

(22) Filed: Sep. 24, 2002

(65) Prior Publication Data

US 2003/0060169 A1    Mar. 27, 2003

(30) Foreign Application Priority Data

Sep. 25, 2001    (JP) .............................. 2001-292343

(51) Int. Cl.
*H04B 1/00* (2006.01)

(52) U.S. Cl. .................... 455/69; 455/404.2; 455/516; 455/63.4; 370/342

(58) Field of Classification Search ............. 455/404.2, 455/456.1, 516, 63.4, 69; 370/342
See application file for complete search history.

(56) References Cited

U.S. PATENT DOCUMENTS

| | | | | |
|---|---|---|---|---|
| 5,471,647 A | * | 11/1995 | Gerlach et al. ............. | 455/63.1 |
| 5,568,469 A | * | 10/1996 | Sherer et al. ................ | 370/448 |
| 5,615,409 A | * | 3/1997 | Forssen et al. .............. | 455/440 |
| 5,689,503 A | * | 11/1997 | Wada et al. ................. | 370/337 |
| 5,757,790 A | * | 5/1998 | Taketsugu .................... | 370/342 |
| 5,974,101 A | * | 10/1999 | Nago .......................... | 375/350 |
| 6,073,032 A | * | 6/2000 | Keskitalo et al. ............ | 455/561 |
| 6,236,834 B1 | * | 5/2001 | Poskett et al. .............. | 455/13.1 |
| 6,347,220 B1 | * | 2/2002 | Tanaka et al. ............ | 455/277.2 |
| 6,594,485 B1 | * | 7/2003 | Ezaki .......................... | 455/417 |
| 2003/0072295 A1 | * | 4/2003 | Maxemchuk ................ | 370/348 |

* cited by examiner

*Primary Examiner*—Matthew Anderson
*Assistant Examiner*—Minh Dao
(74) *Attorney, Agent, or Firm*—Oblon, Spivak, McClelland, Maier & Neustadt, P.C.

(57) ABSTRACT

A radio communications system which can improve the frequency utilization efficiency by combined use of the PDMA system and the CSMA system. Concurrently with the transmission of a second radio wave by the base station in the arrival direction of a first radio wave, carrier sense is performed by mobile stations in regard to the second radio wave. By designing the system so that the first radio wave is transmitted only when the second radio wave is not received, simultaneous transmissions are prevented among those mobile stations which have such small directional differences from the base station that signals cannot be separated, while those mobile stations with large directional differences from the base station are carried out space-division multiplexing. In this way, the frequency utilization efficiency can be improved.

20 Claims, 4 Drawing Sheets

RADIO COMMUNICATIONS SYSTEM, BASE STATION, MOBILE STATION, TRANSMISSION CONTROL METHOD, AND TRANSMISSION CONTROL PROGRAM

CROSS REFERENCE TO RELATED APPLICATIONS

The present document is based on Japanese Priority Document JP2001-292343, filed in the Japanese Patent Office on Sep. 25, 2001, the entire contents of which being incorporated herein by reference.

BACKGROUND OF THE INVENTION

1. Field of the Invention

The present invention relates to a radio communications system, a base station, a mobile station, a transmission control method, and a transmission control program; for example, the present invention is suitable for application to a radio communications system employing a space-division multiplexing system.

2. Description of the Related Art

Recent years have seen an increase in traffic having high-speed and high burst property such as packet communications. As a radio communications system accommodating traffic of such high burst property, there is available the TDMA/TDD system fixedly performing frequency allocation which often entails inconvenience.

Consequently, as a multiple access system for applying a radio communications system having traffic of high burst property, the CSMA (Carrier Sense Multiple Access) system may be considered. In this CSMA system, if a mobile station desires to carry out transmission, whether or not any other mobile station is in the process of performing the transmission is determined in advance by carrying out reception of a carrier wave (this operation is referred to as "carrier sense"); and if a received power is less than a predetermined value, it is considered that the other mobile station is not in the process of performing the transmission (this status is referred to as "idle"), hence, the transmission is carried out.

On the other hand, if the received power from the mobile station exceeds the predetermined value, it is determined that the other mobile station is in the process of performing the transmission (this status is called "busy"), so that the station starts its transmission after the transmission of the other mobile station is complete or after a lapse of random time.

By these operations, the CSMA system makes effective use of an allocated frequency for traffic of high burst property, thereby contributing to improving the frequency utilization efficiency.

Now, on the other hand, techniques of improving receiving property by controlling the directivity of an antenna with an adaptive array antenna to eliminate interference waves and other factors are under research.

Take a radio communications system based on the TDMA/TDD (Time Division Multiple Access/Time Division Duplex) system for instance. It is considered to employ the TDD characteristic of utilizing the same frequency for both transmission and reception so that the transmission may be made by applying the directivity of an array antenna which is obtained when the base station receives a signal from the mobile station. Installation of the array antenna in the base station makes it possible to gain effects of the adaptive array antenna in both transmission and reception even if a normal omnidirectional antenna is provided in the mobile station.

Further, the PDMA (Path Division Multiple Access) system which divides a space by controlling the directivity by means of the adaptive array antenna so as to use the same frequency simultaneously has been considered. For example, if the PDMA system is applied to a communications system of the TDMA/TDD method having a total of 8 slots with 4 slots for uplink (transmission from the mobile stations to the base station) and 4 slots for downlink (transmission from the base station to the mobile stations), communications between a plurality of mobile stations and the base station can be carried out within one slot, thus enabling the frequency utilization efficiency to be improved as a whole.

In the PDMA system, since space division is performed by employing the directivity of an array antenna, it must be noted that if the PDMA system has directions of the two mobile stations in close proximity when viewed from the base station, the same slot cannot be allocated to these two mobile stations.

Consequently, the radio communications system in accordance with the PDMA system is so designed that the base station preliminarily-detects the direction of each mobile station so as to allocate the same slot to those mobile stations having a certain degree of angular difference.

If the CSMA system is applied to the above-mentioned PDMA system, a further improvement of the frequency utilization efficiency can be possibly accomplished.

However, the PDMA system is based on the premise of application to the TDMA/TDD system, and not suited to traffic with high burst property such as packet communications suitable for the CSMA system.

Namely, in CSMA system, since the transmission from other mobile stations is inhibited while the transmission is being carried out by one mobile station, the base station cannot detect an azimuth of plural mobile stations at the same moment. Herein lies a problem that space division multiplexing by means of PDMA system is not applicable at least to the uplink. at least to the uplink.

SUMMARY OF THE INVENTION

The present invention has been made in view of an above-mentioned need and proposes a radio communications system, a base station, a mobile station, a transmission control method and a transmission control program which can improve the frequency utilization efficiency by combined use of the PDMA system and the CSMA system.

In the present invention which provides ways and means of coping with the need, a radio communications system comprises a base station and a plurality of mobile stations carrying out communications with the base station. The base station comprises a first radio wave receiving means for receiving a first radio wave transmitted by a mobile station, an arrival direction detecting means for detecting an arrival direction of the first radio wave received, and a second radio wave transmitting means for transmitting, upon receiving the first radio wave, a second radio wave having a frequency different from a frequency of the first radio wave in the arrival direction of the first radio wave detected. Each of the mobile station comprises a first radio wave transmitting means for transmitting a first radio wave, a second radio wave receiving means for receiving a second radio wave, and a transmission control means for controlling the first radio wave transmitting means so as to stop the transmission of the first radio wave, when the second radio wave receiving means is receiving the second radio wave.

The system is so designed that while the base station transmits the second radio wave in the arrival direction of the first radio wave, the mobile stations perform carrier sense with respect to the second radio wave and the first radio wave is transmitted only when the second radio wave is not being received. As a result, simultaneous transmissions are prevented among those mobile stations having too small directional differences with the base station to separate signals, and space division multiplexing is performed with respect to those mobile stations having large directional differences, thereby improving the frequency utilization efficiency.

Further, other objects and effects of the present invention will be apparent from the following detailed description.

As apparent from the above-mentioned description, it is a feature and advantage of the radio communications system according to the present invention that the base station transmits the second radio wave in the arrival direction of the first radio wave, while, at the same time, the mobile station performs carrier sense operation with respect to the second radio wave so that the first radio wave is transmitted only when the second radio wave is not being received, whereby simultaneous transmissions are prevented among those mobile stations having too small directional differences with the base station to separate signals, space-division multiplexing being performed with respect to those mobile stations having large directional differences with the base station. In this manner, improvement of the frequency utilization efficiency of a radio communications system can be accomplished.

DETAILED DESCRIPTION OF THE PREFERRED EMBODIMENT

An embodiment of the present invention will now be described below with reference to the accompanying drawings.

1. Configuration of a Radio Communications System

Figure 1:
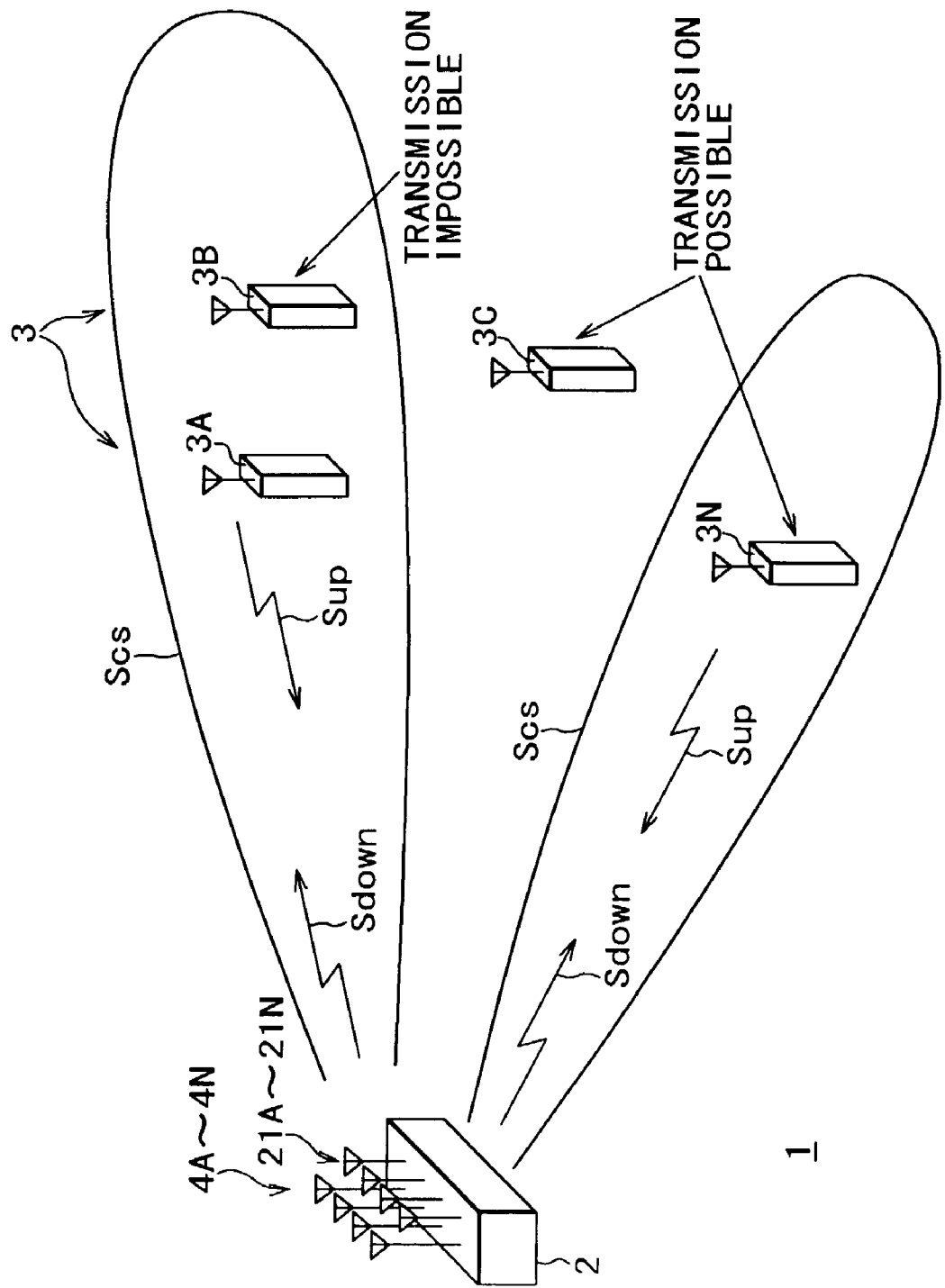
FIG. 1 is a schematic diagram showing the overall configuration of a radio communications system according to the present invention.

In FIG. 1, there is shown a radio communications system 1 according to the present invention which comprises a base station 2 having an adaptive array antenna and a plurality of mobile stations 3 (3A-3N), each carrying a omnidirectional antenna.

The radio communications system 1 is so designed to improve frequency utilization efficiency by jointly employing multiple accesses according to the CSMA system and space-division multiple accesses according to the PDMA system.

Namely, each of the mobile stations 3, prior to transmitting an uplink wave Sup, performs carrier sense with respect to carrier sense wave Scs, which is a characteristic feature of the present invention, and only when it is determined after performing carrier sense operation that those mobile stations 3 located in the vicinity are not carrying out any transmission, the omnidirectional transmission of the uplink wave Sup to the base station 2 is performed.

The base station 2 receives the uplink wave Sup as a first radio wave and detects its arrival direction according to, for example, the Standard MMSE (Minimum Mean Square Error). Then, the base station 2 directs a downlink wave Sdown, via the adaptive array antenna, in the arrival direction of the uplink wave Sup, and transmits it.

Simultaneously, at this instant, the base station 2 directs a carrier sense wave Scs having a frequency different from a frequency of the downlink wave Sdown in the arrival direction of the uplink wave Sup and transmits it.

In this manner, the base station 2 transmits the carrier sense wave Scs as a second radio wave in a direction toward the mobile station 3 transmitting the uplink wave Sup. And the other mobile stations 3, by performing a carrier sense operation on this carrier sense wave Scs, prevents simultaneous transmissions among those mobile stations 3 whose azimuth from the base stations are in close proximity to one another, thus realizing simultaneously the CSMA system and the PDMA system.

2. Base Station Configuration

Next, referring to FIG. 2, configuration of the base station 2 will be described.

Figure 2:
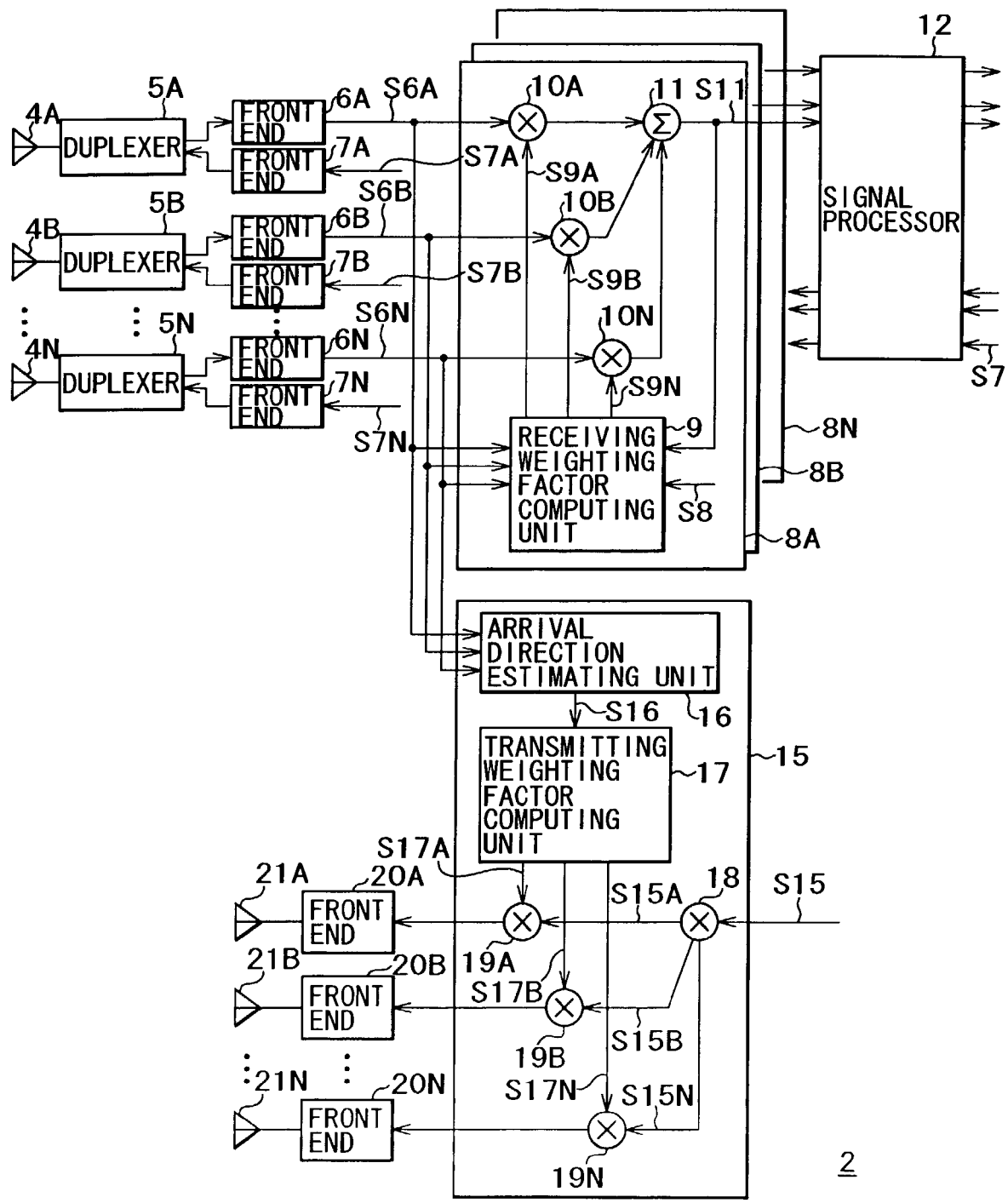
FIG. 2 is a block diagram showing the configuration of a base station according to the present invention.

FIG. 2 shows the base station 2 according to the present invention including transmitting/receiving antenna elements 4A-4N constituting as a whole an array antenna of N-elements. There are receiving front ends 6A-6N and transmitting front ends 7A-7N respectively connected to the transmitting/receiving antenna elements 4A-4N via respective duplexers 5A-5N.

After the amplification, frequency conversion, and demodulation of the uplink wave Sup received via respective antenna elements 4A-4N, the receiving front ends 6A-6N carry out digital conversion to generate received signals S6A-S6N. These signals are supplied to M units of receiving adaptive array processors 8A-8M having the same configuration.

The receiving adaptive array processors 8A-8M as a first radio wave receiving means function independently of one another and respectively receive the uplink waves Sup arriving from M directions independently.

Namely, a receiving weighting factor computing unit 9 of the receiving adaptive array processors 8A-8M calculates proper weighting factors S9A-S9N for received signals S6A-S6N based on the received signals S6A-S6N, a post-synthesis received signal S11 outputted from an adder 11 in a later phase, and a reference signal S8 consisting of existing correct signals, and supplies respective factors to corresponding weighting factor multipliers 10A-10N.

After multiplying respective received signals S6A-S6N by the weighting factors S9A-S9N, the weighting factor multipliers 10A-10N outputs the values obtained to the adder 11. The adder 11 controls the receiving directivity of the entire transmitting/receiving antenna elements 4A-4N by synthesizing the received signals S6A-S6N to generate the received signals S11.

In this manner, the receiving adaptive array processors 8A-8M spatially separate those uplink waves Sup transmitted from respective corresponding mobile stations 3 from the other uplink waves Sup and receive them.

A signal processor 12 inputs the received signals S11 outputted from respective receiving adaptive array processors 8A-8M, performs error correction, decoding, and other processing for respective signals, then outputs them to a circuit of a later phase.

In addition, the signal processor 12, after applying various processing such as error correction and coding to transmitting signals S7 inputted from the circuit of the previous phase, supplies them to the M units of the transmitting adaptive array processors (not illustrated) having the same configuration.

Each transmitting adaptive array processor separates respective transmitting signals S7 into respective transmitting signals of the N systems. These signals are then multiplied by the corresponding weighting factors S9A-S9N calculated in the corresponding receiving adaptive array processors 8A-8M and supplied as transmitting signals S7A-S7N to corresponding transmitting front ends 7A-7N.

After carrying out processing such as analog conversion, modulation, frequency conversion, and amplification processing on respective transmitting signals S7A-S7N, the transmitting front ends 7A-7N supplies them as downlink waves Sdown via corresponding transmitting/receiving antenna elements 4A-4N.

In this manner, the transmitting adaptive array processors spatially separate the uplink waves Sup and transmit them to respective corresponding mobile stations 3.

In addition to the configuration described above, for purposes of transmitting the above-mentioned carrier sense waves Scs, there are available in the base station 2 a carrier sense wave adaptive array processor 15 as well as carrier sense wave antenna elements 21A-21N as a second radio wave transmitting means.

An arrival direction estimating unit 16 of the carrier sense wave adaptive array processor 15 calculates respective arrival directions (i.e., a direction of each mobile station 3 in the process of performing the transmission) of the uplink waves Sup transmitted by the mobile stations 3 based on the received signals S6A-S6N, and supplies them to a transmitting weighting factor computing unit 17 as arrival direction information S16.

The transmitting weighting factor computing unit 17 calculates weighting factors S17A-S17N so that sharp directivity will generate, respectively, in a plurality of arrival directions indicated with the arrival direction information S16 and supplies respective data to corresponding weighting factor multipliers 19A-19N.

A weighting factor for providing directivity in one direction is expressed by the following equation:

$$W(\theta(1))=[1, \exp(j^{*}k^{*}d^{*}\sin\theta(1), \exp(j^{*}k^{*}2d^{*}\sin\theta(2), \ldots, \exp(j^{*}k^{*}(N-1)d^{*}\sin\theta(1)] \quad (1)$$

where k is $2\pi/\lambda$, d is an interval between antenna elements, and N is the number of antenna elements.

And the weighting factor for providing directivity in a plurality of directions is expressed by the following equation:

$$W=W(\theta(1))+W(\theta(2))+W(\theta(3)) \quad (2)$$

where its directions are $\theta(1)$, $\theta(2)$, and $\theta(3)$.

Based on equation (2), the transmitting weighting factor computing unit 17 calculates the weighting factors S17A-S17N so that sharp directivity will generate in a plurality of arrival directions.

On the other hand, a distributor 18 of the carrier sense wave adaptive array processor 15 separates a carrier sense wave signal S1 comprising a sinusoidal wave supplied from a signal generator (not illustrated) into transmitting signals S15A-S15N of the N systems and supplies them to respective corresponding weighting factor multipliers 19A-19N.

The weighting factor multipliers 19A-19N, after multiplying respective transmitting signals S15A-S15N by the weighting factors S17A-S17N, supply the values obtained to corresponding front ends 20A-20N for carrier sense wave.

After carry out analog conversion, modulation, frequency conversion, and amplification processing on respective transmitting signals S15A-S15N, the front ends 20A-20N for carrier sense wave transmit the values obtained as carrier sense waves Scs via corresponding carrier sense wave antenna elements 21A-21N.

In this manner, the base station 2 transmits carrier sense waves Scs in the arrival directions of uplink waves Sup.

3. Configuration of the Mobile Station

Next, referring to FIG. 3, configuration of the mobile station 3 will be described.

Figure 3:
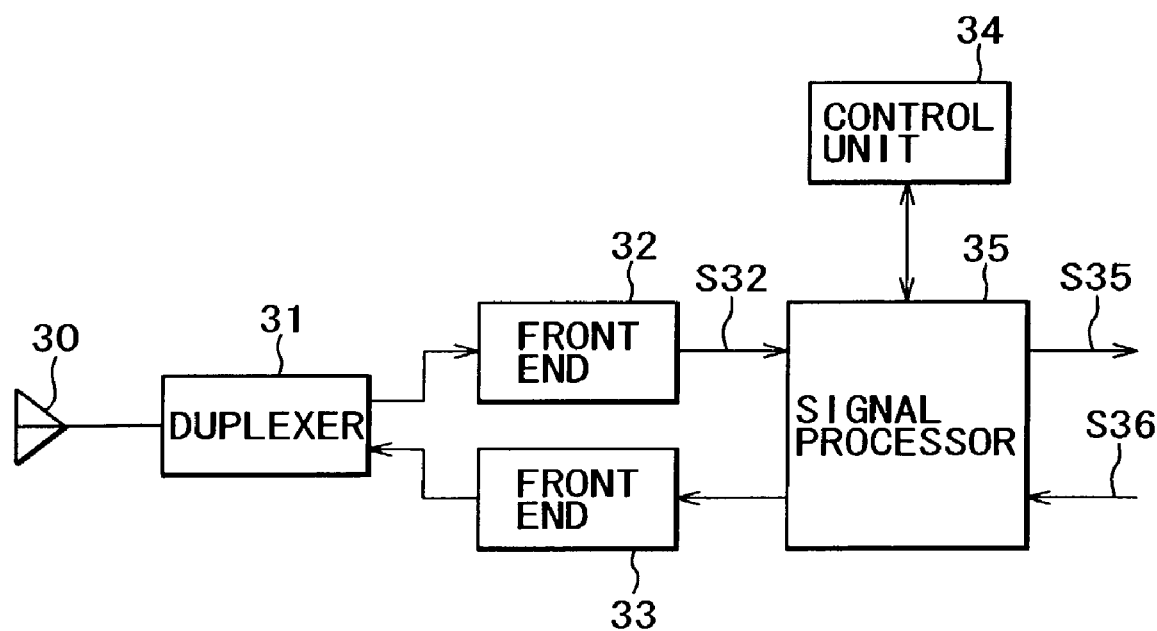
FIG. 3 is a block diagram showing the configuration of a mobile station according to the present invention.

FIG. 3 shows a mobile station 3. To a transmitting antenna element 30, there are respectively connected a receiving front end 32 and a transmitting front end 33 via an antenna duplexer 31.

The receiving front end 32 carries out amplification, frequency conversion, and modulation on the downlink wave Sdown and the carrier sense wave Scs received via the transmitting/receiving antenna element 30, then, performs digital conversion to generate a received signal S32 to be supplied to the signal processor 35 as a second radio wave receiving means.

The signal processor 35 applies frequency analysis such as FFT (Fast Fourier Transform) to the received signal S32 and separates it into a component of the downlink wave Sdown and a component of the carrier sense wave Scs.

And the signal processor 35 generates a downlink received signal S35 by treating the separated component of the downlink wave Sdown with various processing such as error correction and decoding, and outputs it to a circuit of the later phase. Also, the signal processor 35 supplies received power information of the separated carrier sense wave Scs to a control unit 34.

Further, after carrying out various processing such as error correction and coding on transmitting signals S36 inputted from the circuit of the previous phase, the signal processor 35 as a first radio wave transmitting means supplies them to the transmitting front end 33. The transmitting front end 33 applies the analog conversion, demodulation, frequency conversion, and amplification processing to respective transmitting signals S36 and transmits them as the uplink wave Sup via the transmitting/receiving antenna element 30.

At this point, the control unit 34 as a transmission control means, according to a transmission control program stored in a built-in ROM (Read Only Memory), performs carrier sense operation with respect to the carrier sense wave Scs prior to the transmission of the uplink wave Sup.

Namely, the control unit 34 of the mobile station 3 compares the received power level of the carrier sense wave Scs with a predetermined received power reference value. Should the received power level of the carrier sense wave Scs fall below the received power reference value, the control unit 34 determines that the carrier sense wave Scs is not transmitted in the direction of the mobile station 3, with no presence of other mobile stations 3 in the process of performing the transmission in the direction of the mobile station 3 when viewed from the base station 2, and thereby controls the signal processor 35 to cause the uplink wave Sup to be transmitted.

If, on the other hand, the received power level of the carrier sense wave Scs exceeds the received power reference value, the control unit 34 of the mobile station 3 determines that the carrier sense wave Scs is being transmitted in the direction of the mobile station 3 with the presence of other mobile stations 3 in the process of performing the transmission in the direction of the mobile station 3 when viewed from the base station 2, and thereby controls the signal processor 35 to stop the transmission of the uplink wave Sup.

4. Carrier Sense Operation in the Radio Communications System

Again, referring to FIG. 1, carrier sense operation in the radio communications system according to the present invention will be described in detail.

Figure 4:
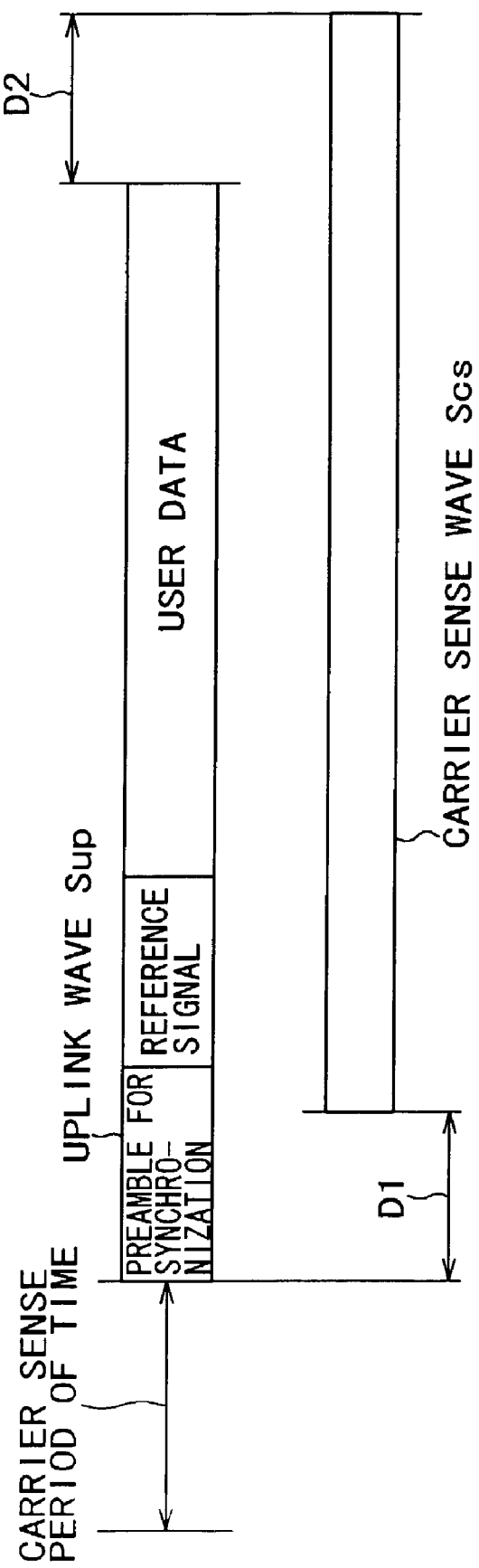
FIG. 4 is a schematic diagram showing transmitting timing of a carrier sense wave.

In the radio communications system 1, if a mobile station 3A is to start transmitting the uplink wave Sup, the mobile station 3A will perform carrier sense operation to the carrier sense wave Scs during a carrier sense period of time shown in FIG. 4.

If it is determined as a result of carrier sense operation that no carrier sense wave Scs has been transmitted in the direction of the mobile station 3A, the mobile station 3A carries out the omnidirectional transmission of the uplink wave Sup of packet structure shown in FIG. 4.

Upon receiving the uplink wave Sup from the mobile station 3A, the base station 2 directs synthetic directivity of the transmitting/receiving antenna elements 4A-4N in the direction of the mobile station 3A, and at the same time, after a lapse of predetermined standby time D1, transmits the carrier sense wave Scs from the carrier sense antenna elements 21A-21N in the direction of the mobile station 3A.

Under these circumstances, a mobile station 3B having a small directional difference with the mobile station 3A when viewed from the base station 2 has such a high received power level of the carrier sense wave Scs that the transmission is in the impossible state, whereas the mobile stations 3C-3N having large directional differences with the mobile station 3A have such low received power levels of the carrier sense waves Scs that the transmission is in the possible state.

Further, when the mobile station 3N in the transmission possible state transmits the uplink wave Sup, the base station 2 responds by transmitting the carrier sense waves Scs in the directions of the mobile stations 3A and 3N.

Still further, when the reception of the uplink wave Sup stops, after a lapse of standby time D2, the base station 2 stops transmitting the carrier sense waves Scs.

5. Operation and Effect

In the above-mentioned configuration, the mobile station 3 of the radio communications system 1 carries out carrier sense operation with respect to the carrier sense wave Scs prior to transmitting the uplink wave Sup.

If the received power level of the carrier sense wave Scs falls below the received power reference value, the mobile station 3 starts transmitting the uplink wave Sup on an assumption that the carrier sense wave Scs is not transmitted by the base station 2 in the direction of the mobile station 3 with no presence of other mobile stations in the process of performing the transmission in the direction of the mobile station 3 when viewed from the base station 2.

Upon receiving the uplink wave Sup, the base station 2 transmits a carrier sense wave Scs of sharp directivity in the arrival direction of the uplink wave Sup.

If, on the other hand, the received power level of the carrier sense wave Scs exceeds the received power reference value, the mobile station 3 stops transmitting the uplink wave Sup on an assumption that the carrier sense wave Scs is being transmitted from the base station 2 in the direction of the mobile station 3 with the presence of other mobiles stations 3 in the process of performing the transmission in the direction of the mobile station 3 when viewed from the base station 2.

In the configuration described above, the base station 2 is designed to transmit the carrier sense wave Sos in the arrival direction of the uplink wave Sup. At the same time, the mobile station 3 is designed to perform carrier sense operation with respect to the carrier sense wave Scs, so that if the received power thereof falls below the predetermined value, the uplink wave Sup is transmitted, and if the received power thereof exceeds the predetermined value, the transmission of the uplink waves Sup is stopped, thereby preventing simultaneous transmissions among those mobile stations 3 having too small directional differences when viewed from the base station 2 to separate signals. In case of those mobile stations 3 having large directional differences when viewed from the base station 2, space-division multiplexing by means of the PDMA system can be implemented.

6. Other Embodiments

In the preferred embodiment described-above, the adaptive array antenna is employed to transmit the downlink wave Sdown and the carrier sense wave Scs and to receive the uplink wave Sup. While the invention has been particularly shown and described with reference to the preferred embodiment, it will be understood that the present invention is not limited thereto with various modifications to be made therein. For example, a sector antenna constituted by a plurality of antenna elements having directivity may be put to use. In this case, too, the carrier sense wave Scs can be transmitted with directivity in the arrival direction of the uplink wave Sup, and the same effects as the preferred embodiment can be achieved.

Further, in the above-mentioned embodiment, it is so designed that the carrier sense operation is performed according to a transmission control program stored in a ROM built in the control unit 34 of each mobile station 3 so as to implement transmission control of the uplink wave Sup. The present invention is not limited in its application. Another modification may include implementation of the transmission control by installing in the mobile stations 3 a program storage medium in which the transmission control program is stored.

For program storage media for installing the transmission control program in the mobile stations 3, there are, for example, not only package media such as a floppy disc, a CD-ROM (Compact Disc-Read Only Memory), and a DVD (Digital Versatile Disc) but also a semiconductor memory, a magnetic disc, and other media in which the transmission program can be temporarily or permanently stored.

What is claimed is:

1. A radio communications system comprising a base station and a plurality of mobile stations each configured to communicate with said base station, wherein:

said base station comprises:

a first radio wave receiving unit configured to receive a first radio wave transmitted by one of said mobile stations;

an arrival direction detecting unit configured to detect an arrival direction of said first radio wave received;

a second radio wave transmitting unit configured to transmit, when said first radio wave is received, a reply radio wave in response to said first radio wave, said reply radio wave configured to be transmitted in the arrival direction, and configured to transmit a second radio wave having a different frequency from a frequency of said first radio wave and said reply radio wave, said second radio wave configured to be transmitted in the arrival direction of said first radio wave detected; and said mobile stations each comprise:

a first radio wave transmitting unit configured to transmit said first radio wave;

a second radio wave receiving unit configured to receive said second radio wave; and a transmission control unit configured to stop, when said second radio wave is being received by said second radio wave receiving unit, the transmission of said first radio wave by controlling said first radio wave transmitting unit.

2. A radio communications system according to claim 1, wherein:

said first radio wave receiving unit and said second radio wave transmitting unit comprise an adaptive array antenna.

3. The radio communications system according to claim 2, wherein:

said mobile stations each further comprises a carrier sense detection unit configured to detect said second radio wave.

4. The radio communication system according to claim 2, wherein:

said mobile stations each further comprises a transmission control unit configured to stop, while a predetermined time period is running, the transmission of said first radio wave by controlling said first radio wave transmitting unit.

5. The radio communications system according to claim 1, wherein:

said mobile stations each further comprises a carrier sense detection unit configured to detect said second radio wave.

6. The radio communication system according to claim 1, wherein:

said mobile stations each further comprises a transmission control unit configured to stop, while a predetermined time period is running, the transmission of said first radio wave by controlling said first radio wave transmitting unit.

7. A base station configured to communicate with a plurality of mobile stations, comprising:

a first radio wave receiving unit configured to receive a first radio wave transmitted by one of said mobile stations when said one of said mobile stations is not receiving a predetermined second radio wave;

an arrival direction detecting unit configured to detect the arrival direction of said first radio wave received; and a second radio wave transmitting unit configured to transmit, when said first radio wave is received, a reply radio wave in response to said first radio wave, said reply radio wave configured to be transmitted in the arrival direction, and configured to transmit said second radio wave having a different frequency from a frequency of said first radio wave and said reply radio wave, said second radio wave configured to be transmitted in the arrival direction of said first radio wave.

8. A base station according to claim 7, wherein:

said first radio wave receiving unit and said second radio wave transmitting unit comprise an adaptive array antenna.

9. The base station according to claim 8, wherein:

said second radio wave transmitting unit is configured to transmit, while a predetermined standby time is running, said second radio wave having a different frequency from a frequency of said first radio wave in the arrival direction of said first radio wave detected.

10. The base station according to claim 7, wherein:

said second radio wave transmitting unit is configured to transmit, while a predetermined standby time is running, said second radio wave having a different frequency from a frequency of said first radio wave in the arrival direction of said first radio wave detected.

11. A transmission control method, comprising:

detecting an arrival direction of a first radio wave transmitted by a mobile station to a base station when said mobile station is not receiving a predetermined second radio wave; and transmitting by said base station, in the arrival direction of said first radio wave detected, a reply radio wave in response to said first radio wave and said second radio wave having a frequency different from a frequency of said first radio wave and said reply radio wave.

12. The transmission control method according to claim 11, wherein:

said second radio wave is transmitted for a predetermined standby time.

13. A mobile station configured to communicate with a base station, comprising:

a first radio wave transmitting unit configured to transmit a first radio wave;

a second radio wave receiving unit configured to receive a second radio wave on a frequency different from a frequency of said first radio wave, said second radio wave transmitted by said base station in an arrival direction of said first radio wave, and said second radio wave receiving unit configured to receive a reply radio wave on a frequency different from the frequency of said first radio wave, said reply radio wave transmitted by said base station in the arrival direction, said second radio wave transmitted by said base station when said base station is receiving said first radio wave; and a transmission control unit configured to stop, when said second radio wave unit is receiving said second radio wave, the transmission of said first radio wave by controlling said first radio wave transmitting unit.

14. The mobile station according to claim 13, wherein:

said mobile station each further comprises a carrier sense detection unit configured to detect said second radio wave.

15. The mobile station according to claim 13, wherein:

said mobile station further comprises a transmission control unit configured to stop, while a predetermined time period is running, the transmission of said first radio wave by controlling said first radio wave transmitting unit.

16. A transmission control method by a mobile station for controlling transmission of a radio wave, said method comprising the steps of:

receiving a second radio wave transmitted from said base station in an arrival direction of a first radio wave, said second radio wave transmitted on a frequency different from a frequency of said first radio wave, said first radio wave transmitted by a transmitting mobile, said second radio wave transmitted when said base station is receiving said first radio wave;

permitting transmission of said first radio wave when said second radio wave is not being received from said base station;

inhibiting transmission of said first radio wave when said second radio wave is being received from said base station; and receiving a reply radio wave, in an arrival direction of a first radio wave and on a frequency different from the frequency of the second radio wave, transmitted from said base station, in response to said first radio wave when said mobile station is said transmitting mobile.

17. The transmission control method according to claim 16, wherein:

said method further comprises inhibiting transmission of said first radio wave while a predetermined time period is running.

18. A computer readable storage medium encoded with computer program instructions which cause a computer to implement a method of transmission control, the method comprising:

receiving a second radio wave transmitted from said base station in an arrival direction of a first radio wave, said second radio wave transmitted on a frequency different from a frequency of said first radio wave, said first radio wave transmitted by a transmitting mobile, said second radio wave transmitted when said base station is receiving said first radio wave;

permitting the transmission of said first radio wave when said second radio wave is not being received from said base station;

inhibiting the transmission of said first radio wave when said second radio wave is being received from said base station; and receiving a reply radio wave, in an arrival direction of a first radio wave and on a frequency different from the frequency of the second radio wave, transmitted from said base station, in response to said first radio wave when said mobile station is said transmitting mobile.

19. The computer readable storage medium encoded with computer program instructions which cause a computer to implement a method of transmission control according to claim 18, wherein:

said method further comprises inhibiting transmission of said first radio wave while a predetermined time period is running.

20. A base station configured to communicate with a plurality of mobile stations, comprising:

first radio wave receiving means for receiving a first radio wave transmitted by one of said mobile stations when said one of said mobile stations is not receiving a predetermined second radio wave;

arrival direction detecting means for detecting the arrival direction of said first radio wave received; and second radio wave transmitting means for transmitting, when said first radio wave is received, a reply radio wave in response to said first radio wave, said reply radio wave transmitted in the arrival direction, and transmitting said second radio wave having a different frequency from a frequency of said first radio wave and said reply radio wave, said second radio wave transmitted in the arrival direction of said first radio wave.

* * * * *